United States Patent [19]
Frounfelker

[11] Patent Number: 5,669,177
[45] Date of Patent: Sep. 23, 1997

[54] THERMAL CONTROLLED PLANT PROTECTOR

[76] Inventor: Carl R. Frounfelker, 4939 Oak Hills Ave. NW., Albany, Oreg. 97321

[21] Appl. No.: 643,503

[22] Filed: May 6, 1996

[51] Int. Cl.$^6$ ............................................. A01G 13/02
[52] U.S. Cl. .......................... 47/21; 47/30; 47/DIG. 14
[58] Field of Search ...................... 47/26, 30, 30 OT, 47/21, 21 A, 19, DIG. 14

[56] References Cited

U.S. PATENT DOCUMENTS

| | | |
|---|---|---|
| 3,946,521 | 3/1976 | Oors . |
| 4,233,779 | 11/1980 | Griffith ........................................ 47/26 |
| 4,267,665 | 5/1981 | Wallace et al. . |

FOREIGN PATENT DOCUMENTS

| | | | |
|---|---|---|---|
| 1215951 | 4/1960 | France | ................................. 47/21 A |
| 2621441 | 4/1989 | France | ................................. 47/30 OT |

*Primary Examiner*—Henry E. Raduazo
*Attorney, Agent, or Firm*—Steven J. Adamson

[57] ABSTRACT

A plant protector comprising a housing of sufficient dimensions to enclose a plant and having a ventilation opening therein. A cover is provided for covering the ventilation opening and a thermal controlled actuator is coupled between the cover and housing for moving the cover between a closed position at lower temperatures where the cover is positioned over the opening and an open position at higher temperatures where the cover is not positioned over the opening. The cover may be pivotally mounted on the housing and the actuator is preferably located between the cover and housing adjacent the pivot.

15 Claims, 3 Drawing Sheets

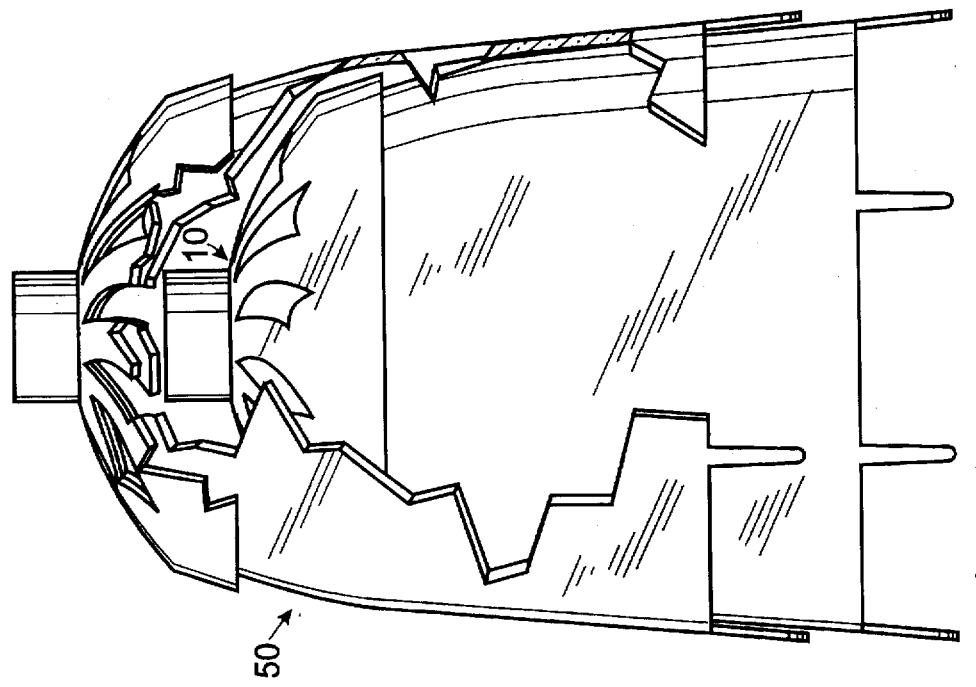
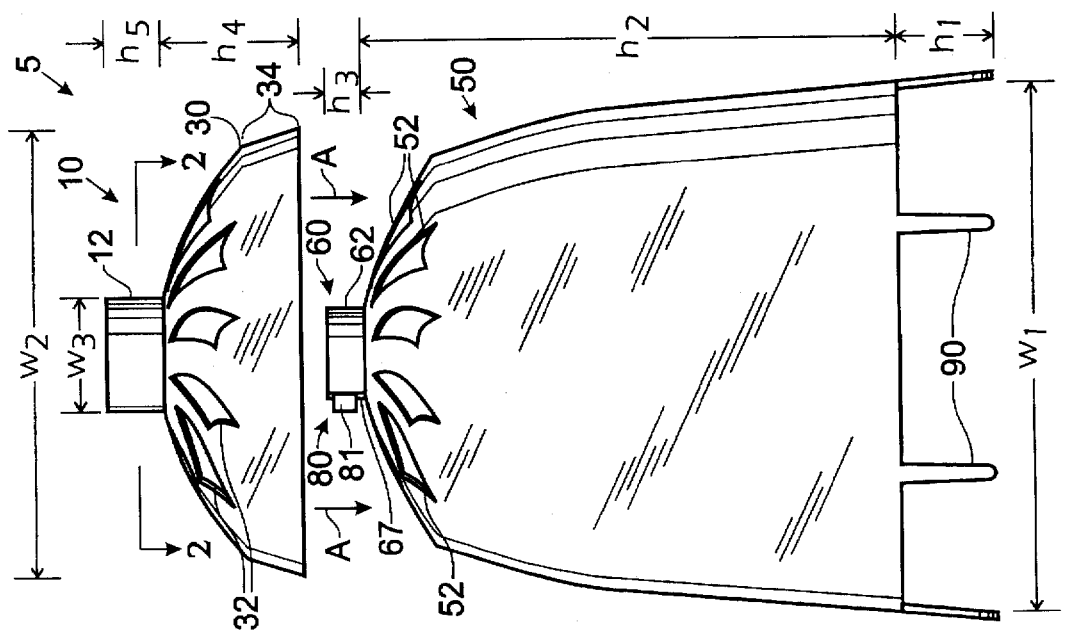
Fig. 7
Fig. 1

THERMAL CONTROLLED PLANT PROTECTOR

FIELD OF THE INVENTION

The present invention relates to devices for protecting plants against adverse environmental conditions. More specifically, the present invention relates to thermally activated devices which protect against lower temperatures, while permitting ventilation at higher temperatures.

BACKGROUND OF THE INVENTION

Plants provide a tremendous benefit to human-kind both as a food source and for ornamental purposes and they have been cultivated for quite some time. In areas of the world that experience appreciable temperature variation, plants may experience damage due to lower temperatures. These lower temperatures may be those which induce frost or freezing or those which are sufficiently extreme though not freezing to produce plant damage. The ability to protect against this damage permits earlier plantings and thereby provides several advantages, including but not limited to, growing a non-indigenous plant, staggering plantings over time to extend harvest and having additional plantings in a season. Cold protection can also be provided near or during harvest.

Initial attempts to protect plants against cold damage have included creating a frame of wood, plastic or aluminum, or the like, and covering this frame with plastic sheeting or glass. Though effective to some extent this system is cumbersome to set up, administer and store. Furthermore, this system does not provide regulated ventilation and may also, due to its size, permit the development of a temperature gradient where larger plants are protected but smaller plants are not. In addition, this and other prior art systems may require daily attendance to cover and uncover plants.

A further prior art attempt to protect plants has recognized the need for regulated ventilation and has incorporated a thermal activator which controls the opening of air vents. The U.S. patent on this device, U.S. Pat. No. 3,946,521, issued to Ours for a Ventilated Plant Protector, illustrates an A-frame structure with two vent openings that utilizes a thermally sensitive actuator to effect movement of vent covers. The actuator is mounted by brackets in the interior of the structure and connects to vent covers through an extensive network of levers, rods and pivots.

A disadvantage of this device is that it provides an extensive mechanical linkage system. The number of components in the system is proportional to the possibility of mechanical failure. Furthermore, each part of a mechanical linkage is a potential source of deleterious friction which may be introduced by rust, dirt accumulation, mechanical damage to the plurality of rods, connectors and pivots, weathering, etc.

Another disadvantage of this system is that many of the components are external, e.g., the connecting rod, pivots, etc., which hinders stacking and increases the probability of mechanical or environmental exposure damage. In addition, the device of Ours is disadvantageous because its shape distorts sunlight as the sun changes position in the sky and may also produce undesired temperature gradients because it is significantly wider at its base. Furthermore, the device of Ours is difficult to manufacture, particularly in an automated format, because of the plurality of components and the location of the actuator internal to the housing.

SUMMARY OF THE INVENTION

Accordingly, it is an object of the present invention to provide a plant protector that functions with a minimum of moving parts.

It is a further object of the present invention to provide such a plant protector in which the actuator mechanism is protected from the elements.

It is another object of the present invention to provide such a plant protector which is designed to reduce the potential for frictional drag.

It is yet another object of the present invention to provide a plant protector that has a housing that generally conforms to the shape of a plant and that provides secure placement on and positioning relative to the ground.

It is also an object of the present invention to provide an increase in the rate at which the ventilation openings are opened in proportion to increases in temperature.

These and related objectives of the present invention may be achieved by use of the thermal controlled plant protector described herein. The plant protector includes a housing of sufficient dimensions to enclose a plant, a cover for a ventilation opening in the housing, and a thermal controlled actuator coupled directly between the cover and housing. The actuator is temperature sensitive such that it moves the cover between a closed position at lower temperatures where the cover is positioned over the opening and an open position at higher temperatures where the cover is not positioned over the opening. This embodiment is advantageous, amongst other reasons, because it provides a minimum number of components.

The present invention also includes providing a single pivot point between the cover and the housing. This design, amongst other aspects of the present invention, reduces deleterious friction.

The present invention further includes completely covering the actuation mechanism to protect it from environmental and mechanical damage. A lip is preferably provided at the periphery of the cover to prevent debris accumulation between the cover and housing.

Other aspects of the present invention include that a mechanism is provided at the base of the housing for securing the plant protector to the ground or positioning it a predefined distance above the ground. Also, the ventilation opening(s) in the housing and/or cover maybe configured such that the rate of opening increases with increasing temperature. Furthermore, when a plurality of ventilation openings are provided, they are preferably distributed evenly so that, for example, water broadcast from a sprinkler or the like enters multiple plant protectors to similar degrees.

The attainment of these and related advantages and features of the invention should be more readily apparent to those skilled in the art after review of the following more detailed description of the invention taken together with the drawings.

BRIEF DESCRIPTION OF THE DRAWINGS

FIG. 1 is a side view of a plant protector in accordance with the present invention in which the cover is positioned above and in alignment with the base.

FIG. 7 is a partial cut-away view of two plant protectors in accordance with the present invention stacked together.

DETAILED DESCRIPTION

Figure 3:
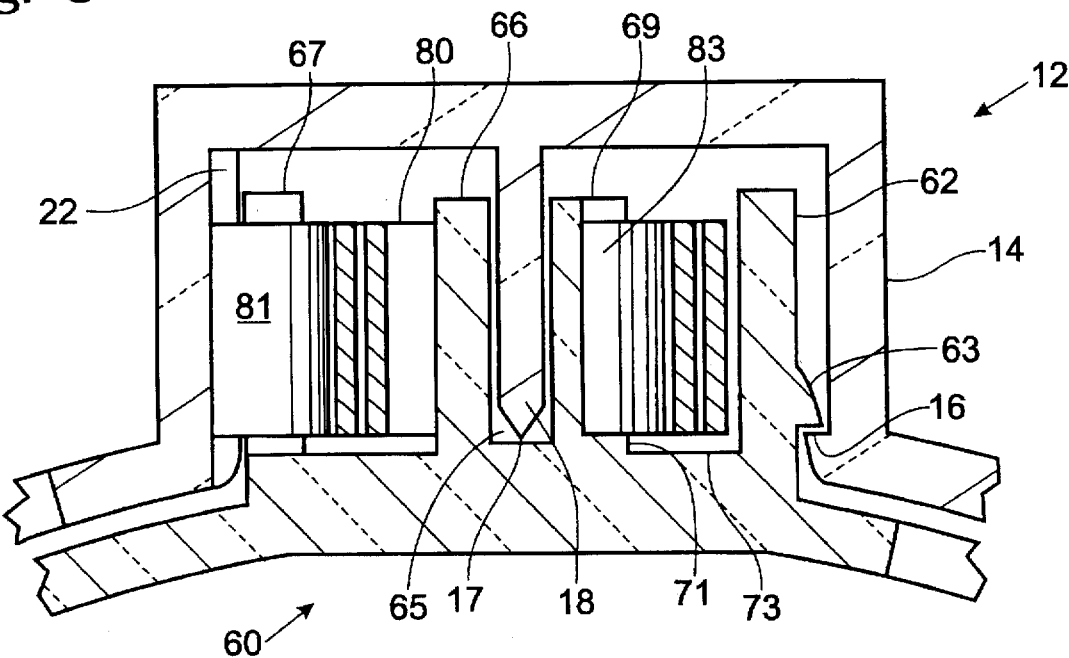
FIG. 3 is a cross-sectional view of the cap of FIGS. 1 and 2, taken along line 3—3.

Referring to FIG. 1, a side view of a plant protector 5 in accordance with the present invention in which a cover 10 is positioned above and in alignment with a housing 50 is shown.

The cover includes a cap 12 which is generally recessed (not shown from the perspective of FIG. 1) to receive an actuator 80 and a lid 30 having a plurality of ventilation openings 32 therein. The lid 30 is designed to cover a top portion of housing 50 and also contains a lip 34 which extends down the housing wall when cover 10 is mounted on housing 50, as shown in FIG. 7. The lip 34 serves to reduce the accumulation of debris in the space between the cover and housing.

The housing 50 is made of a sturdy material such as plastic and preferably out of polyethylene or polycarbonate (which is more rigid than polyethylene) or the like and is configured of sufficient dimensions to facilitate growth of a plant therein. The cover is preferably made of the same material as the housing and both may be either translucent or transparent.

The housing 50 includes a plurality of ventilation openings 52 which are similar in shape and arrangement to those of cover 10. A socket 60 is formed integrally with housing 50 and is configured to receive the actuator 80. A cover securing tab 81 of the actuator is shown extending through a slot 67 in the socket wall 62. When the cover is mounted on the housing, tab 81 is received by a reciprocal slot 22 in the cap (shown in FIGS. 2–3). Arrows A show the direction of movement for mounting the cover to the housing.

The housing 50 also contains legs 90. These legs permit securing the plant protector to the ground or positioning it a fixed distance from the ground. For example, under some climatic conditions, it may be desirable for an increased airflow to reach the plant. This can be achieved by placing the protector a desired distance from the ground. Although the legs are shown as being straight and slightly tapered they may also be barbed or otherwise configured to facilitate secure connection with the ground, be it packed soil, fine soil, sand, gravel, etc. Amongst other benefits, secure connection prevents loss of the protector during wind storms and the like.

In one embodiment, the plant protector has the following approximate dimensions, though it should be recognized that these dimensions can be changed in a manner that would be apparent to one skilled to accommodate different size plants. w1=10", w2=8", w3=1⅛", h1=3", h2=12", h3=⅝", h4=3", h5=¾".

Figure 2:
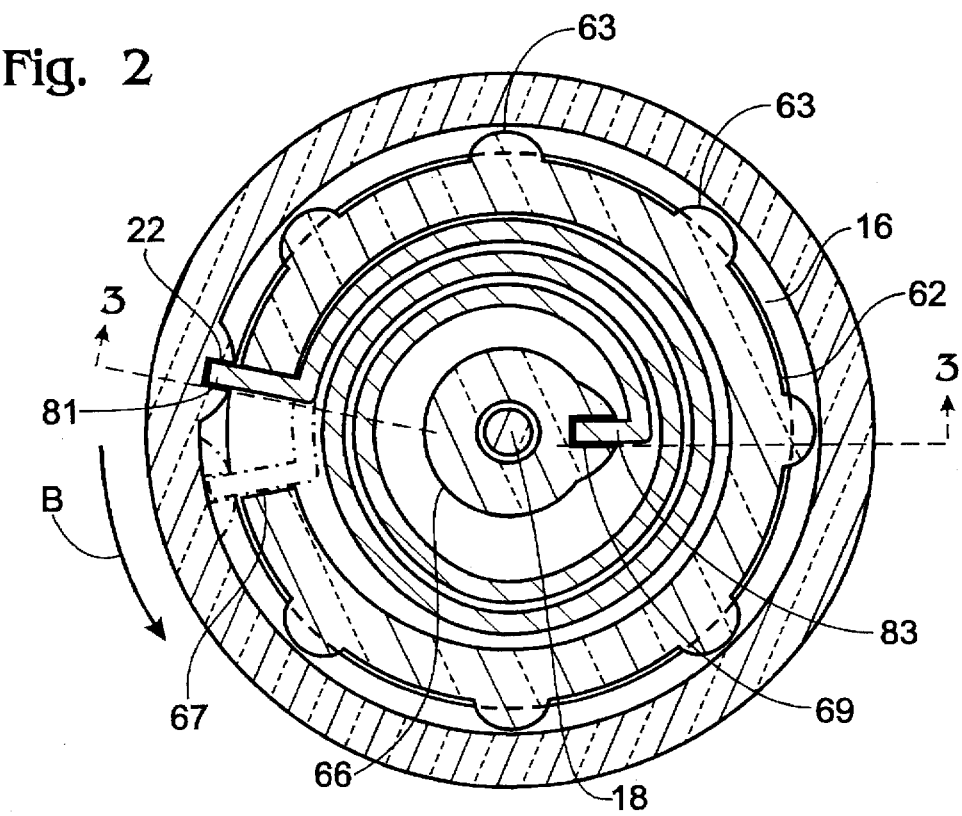
FIG. 2 is a cross-sectional top view of the cap of the plant protector of FIG. 1, taken along line 2—2.

Referring to FIG. 2, a cross-sectional top view of the cap 12, actuator 80 and socket 60 of FIG. 1, taken along a central portion of line 2—2 of FIG. 1, after the cover has been mounted on the housing, is shown. Referring to FIG. 3, a cross-sectional view at an angle of approximately 189 degrees is presented of the cap 12, actuator 80 and socket 60 of FIG. 2, taken along line 3—3. To promote a better understanding of how the actuator is mounted within the housing and cover and how the housing and cover are joined, FIGS. 2 and 3 are discussed together.

The cap 12 contains a cap wall 14 and a pivot pin 18. The socket 60 contains a socket wall 62 and a circular pivot wall 66. When the cap is mounted on the socket, a cap wall rim 16 is pushed down over a plurality of socket wall protrusions 63, which extend from the outer circumference of socket wall 62, and pivot pin 18 is slid into the inner space 65 defined by circular pivot wall 66. The use of a few opposing protrusions 63 permits secure fastening of the cover to the housing and minimizes cover rocking, while reducing the amount of surface area (between the housing and cover) that may potentially come in contact, thereby reducing potential sources of friction. With the exception of contact through the actuator 80, the cover 10 and housing 50 preferably only contact each other at the tip 17 of pivot pin 18. Contact through one point further reduces the potential for friction.

The actuator 80, in the preferred embodiment, is a bi-metal strip. Suitable bi-metal strips are available from Texas Instruments, Materials Division, and several other sources. They are well known as are equations that permit design of an actuator that moves a predefined distance in response to a predefined temperature change.

The actuator 80 has a socket securing tab 83 which fits down into slot 69 until it contacts rest 71. Rest 71 supports the actuator in a position off of the floor 73 of socket 60. Contact of the actuator with the floor induces undesired friction. The actuator 80 also possesses a cover securing tab 81 which projects through slot 67 in socket wall 62 and is so configured that a receiving slot 22 integral to cap wall 14 may be slid down onto a distal portion of cover securing tab 81. The size of slot 67 defines the range of movement of the cap, from the fully closed position illustrated in FIGS. 2–4 to the fully open position illustrated in FIG. 6.

It should be noted that FIG. 3 includes portions of lid 30 and housing 50. A ventilation opening 32 of cover 10 is shown over a portion of the housing which does not contain an opening 52, while an opening 52 in the housing is shown under a portion of lid 30°. This is the closed position. In the partially or fully open positions, the cover is turned such that there is some degree of alignment between the ventilation openings in the cover and housing. Rotation and alignment of the respective ventilation openings is now discussed in more detail.

Figure 4:
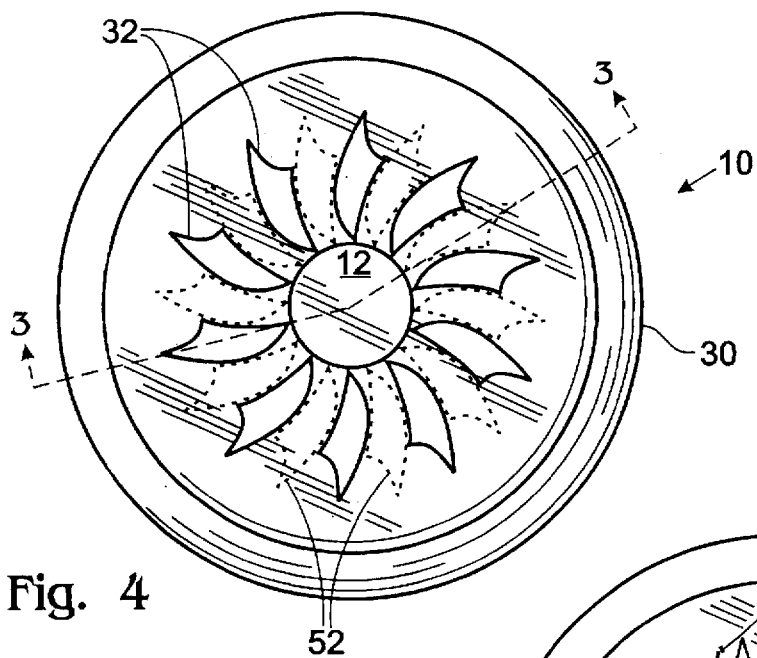
FIGS. 4-6 are top views of the cover for the plant protector of FIG. 1 in accordance with the present invention illustrating fully closed, partially open and fully open positions, respectively.
Figure 5:
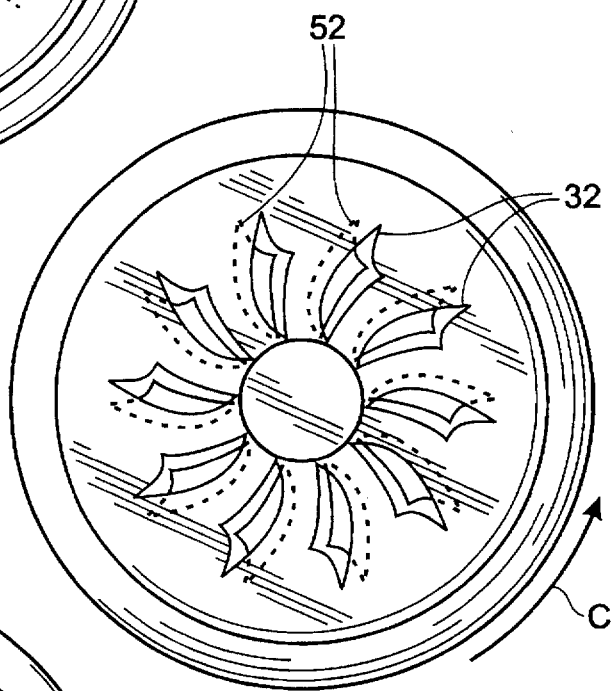
Figure 6:
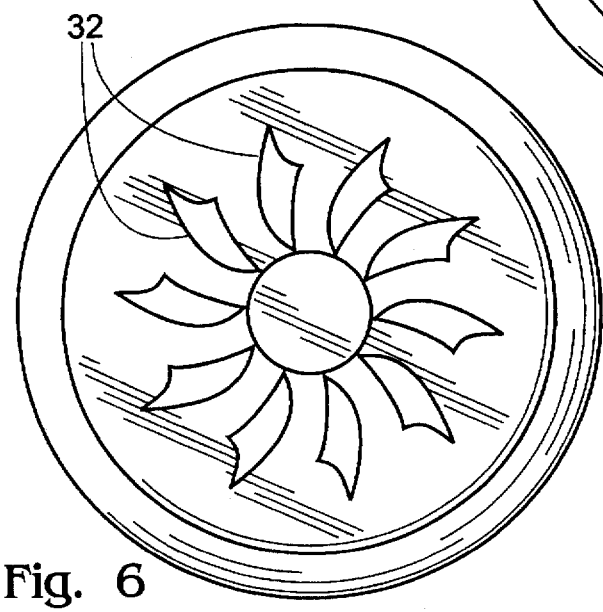

Referring to FIGS. 4–6, top views illustrating the alignment of the ventilation openings in the cover with those in the housing are shown. FIG. 4 represents the closed position, while FIGS. 5–6 represent the partially and fully open positions, respectively.

Referring to FIG. 4, ten (10) ventilation openings 32 are shown in cover 10, each having a first end proximate cap 12 and a second end that extends down lid 30. Lip 34 is shown at the periphery of lid 30. Ten (10) ventilation openings 52 are also indicated in dashed lines in a top portion of housing 50. The openings in the cover are completely misaligned with those of the housing such that ventilation is essentially blocked.

Referring to FIG. 5, as temperature attains a level of 65–70 degrees F. (which is approximate and may vary depending in the region and type of plant the protector is used in connection with), plants begin to require ventilation. Hence, actuator 80 is designed such that at this temperature it begins to expand causing tab 81 to move in the direction of arrow B of FIG. 2 which in turn causes cover 10 to rotate in the direction of arrow C of FIG. 5. As the cover begins to rotate, each ventilation opening 32 moves towards alignment with a housing ventilation opening 52 located thereunder. It should be recognized that the shape of the ventilation openings 32/52 is such that the rate of increase in the size of the opening that is created increases with increasing temperature. It should also be recognized that the number and shape of the ventilation openings may differ from that described herein. The essential aspect being that appropriate ventilation for a particular plant is achieved.

Referring to FIG. 6, ventilation openings 32 of the cover are in complete alignment with ventilation openings 52 of the housing, thereby achieving the fully open position. The dashed lines of ventilation openings 52 are obscured by the solid lines of ventilation openings 32. The actuator is preferably designed to achieve a fully open position at approximately 85–90 degrees F. If additional ventilation is desired, the protector can be placed a predefined distance from the ground as described above with reference to FIG. 1.

The plant protector functions in part by retaining heat generated by solar radiation. The soil under the protector is heated during the day and this heat is retained by the protector during the night.

Referring to FIG. 7, a partial cut-away view of two plant protectors in accordance with the present invention is presented which illustrates how the plant protectors may be stacked. The housing 50 tapers slightly towards the top and cover 10 is so configure as to match the contour of the top portion of the housing. As a result of this design, when two protectors are stacked, the cover and actuator of the bottom protector do not come in contact with and thus do not receive mechanical stress from the protector stacked above.

Alternative Embodiments

Though a preferred embodiment is described above, there are many alternative embodiments of the present invention. These alternative embodiments include any which attempt to reduce the complexity of the linkage between the actuator and the housing and vent covers, embodiments that attempt to reduce friction, and embodiments that protect against environmental (including the accumulation of dirt and microorganisms) and mechanical damage.

More specifically, the present invention includes embodiments comprising actuator arrangements that move a vent cover linearly as opposed to rotatably, e.g., the vent cover slides linearly over an opening, and embodiments in which the cover does not have ventilation openings but rather a solid member configured to cover the ventilation openings in the housing in the closed position and to be moved away from them in the open position. The ventilation system taught herein may also be used in protectors that are of sufficient size to house a plurality of plants. Other embodiments of the present invention also include providing components similar to those discussed above, but with the actuator and vent hole cover suspended from the ceiling of the housing as opposed to being mounted on top of it. In yet another embodiment, the pivot pin could extend upwardly from the housing as opposed to protruding from the cover.

Furthermore, while the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention and the limits of the appended claims.

I claim:

1. A plant protector, comprising:
   a housing of sufficient dimensions to enclose a plant, said housing having a plurality of ventilation openings therein;
   a cover for said ventilation openings; and
   a thermal controlled actuator directly operably coupled to both said housing and said cover for moving said cover between a closed position at lower temperatures where said cover is positioned over said openings and an open position at higher temperatures where said cover is not positioned over said openings; and
   wherein said plurality of ventilation openings are distributed around said plant protector so as to provide cross ventilation of air through said plant protector.

2. The plant protector of claim 1, wherein said housing comprises a first socket formed integrally therein for receiving said actuator; and
   said cover includes a second socket formed integrally therein for receiving said actuator.

3. The plant protector of claim 2, wherein said cover includes a pivot pin formed centrally in said second socket that is configured to contact and rotate about a point in said first socket; and
   wherein said actuator is mounted in said first and second sockets such as to cause a rotation of said cover about said pivot pin in moving said cover between said closed and open positions.

4. The plant protector of claim 1, wherein said cover includes a plurality of ventilation openings; and
   further wherein said open position is achieved by complete alignment of the ventilation openings in said cover with those of said housing and said closed position is achieved by complete misalignment of the ventilation openings in said cover relative to those of said housing.

5. The plant protector of claim 1, wherein said cover is positioned generally on top of said housing and includes a lip at its periphery, said lip extending down along a side of said housing to impede an accumulation of debris between said cover and said housing.

6. The plant protector of claim 1, wherein said ventilation opening and said cover are configured such that the rate at which the cover is not positioned over the opening, as the actuator moves the cover from the closed to open position, increases with increase in temperature.

7. The plant protector of claim 1, wherein said plurality of ventilation openings are evenly distributed.

8. A plant protector, comprising:
   a housing of sufficient dimensions to enclose a plant, said housing having a ventilation opening therein;
   a cover for said ventilation opening; and
   a thermal controlled actuator operably coupled to said housing and said cover for moving said cover between a closed position at lower temperatures where said cover is positioned over said opening and an open position at higher temperatures where said cover is not positioned over said opening;
   wherein the weight of said cover is essentially balanced on said housing on a single pivot point; and
   wherein said cover includes a pivot pin and said housing includes a pivot pin receiving shaft, add wherein the point of contact of said pivot pin with the bottom of said receiving shaft is said pivot point.

9. The plant protector of claim 1, further comprising means for securing said housing to the ground.

10. The plant protector of claim 9, wherein said securing means also permits setting said housing a predefined distance from the ground.

11. The plant protector of claim 8, wherein said cover includes a cover socket for receiving said actuator and said housing includes a housing socket for receiving said actuator.

12. The plant protector of claim 11, wherein said pivot pin is located in said cover socket and said receiving shaft is located in said housing socket.

13. The plant protector of claim 12, wherein said actuator is positioned in said cover and housing sockets in such a manner that movement of said actuator causes said cover to rotate relative to said pivot point.

14. The plant protector of claim 13, wherein said pivot pin is centrally located in said cover socket, said receiving shaft is centrally located in said housing socket, and said actuator is positioned about said pivot pin and said receiving shaft.

15. A plant protector, comprising:

a housing of sufficient dimensions to enclose a plant, said housing having a ventilation opening therein;

a cover for said ventilation opening; and a thermal controlled actuator operably coupled to said housing and said cover for moving said cover between a closed position at lower temperatures where said cover is positioned over said opening and an open position at higher temperatures where said cover is not positioned over said opening;

wherein said actuator is mounted external to said housing and covered by said cover.

* * * * *